US008537177B2

(12) United States Patent
Bhaskaran et al.

(10) Patent No.: US 8,537,177 B2
(45) Date of Patent: Sep. 17, 2013

(54) SYSTEM AND METHODS FOR GAMUT BOUNDED SATURATION ADAPTIVE COLOR ENHANCEMENT

(75) Inventors: Vasudev Bhaskaran, Sunnyvale, CA (US); Sujith Srinivasan, Bangalor (IN); Nikhil Balram, Mountain View, CA (US)

(73) Assignee: Marvell World Trade Ltd., St. Michael (BB)

(*) Notice: Subject to any disclaimer, the term of this patent is extended or adjusted under 35 U.S.C. 154(b) by 734 days.

(21) Appl. No.: 12/815,884

(22) Filed: Jun. 15, 2010

(65) Prior Publication Data

US 2011/0013208 A1    Jan. 20, 2011

Related U.S. Application Data

(60) Provisional application No. 61/187,049, filed on Jun. 15, 2009.

(51) Int. Cl.
*G09G 5/00* (2006.01)
*G09G 5/02* (2006.01)
*H04N 9/64* (2006.01)
*H04N 5/44* (2011.01)
*H04N 9/68* (2006.01)
*H04N 1/46* (2006.01)
*H04N 1/40* (2006.01)
*G03F 3/08* (2006.01)
*G06K 9/00* (2006.01)
*G06K 9/40* (2006.01)
*G06K 9/36* (2006.01)

(52) U.S. Cl.
USPC ........... 345/600; 345/590; 345/601; 345/606; 345/549; 345/690; 348/254; 348/256; 348/630; 348/645; 348/674; 358/519; 358/520; 358/523; 358/525; 358/448; 382/167; 382/254; 382/274; 382/276; 382/304

(58) Field of Classification Search
CPC .......................... H04N 1/6027; H04N 1/6058
USPC ................ 345/581, 589–591, 600–604, 606, 345/11–612, 618–619, 547–549, 555, 690, 345/502–503, 505; 548/253–254, 256, 552, 548/557, 560, 571, 577, 630, 634, 644–645, 548/649, 663, 671, 674, 703, 708; 358/515, 358/518–520, 523, 525, 448; 382/162, 166–167, 254, 274, 276, 285, 299–300
See application file for complete search history.

(56) References Cited

U.S. PATENT DOCUMENTS 6,078,686 A * 6/2000 Kim .............................. 382/167
6,342,951 B1 * 1/2002 Eschbach et al. .............. 358/1.9
7,116,441 B1 10/2006 Matsuoka
(Continued)

FOREIGN PATENT DOCUMENTS

EP            1 909 486         4/2008

*Primary Examiner* — Wesner Sajous

(57) ABSTRACT

System and methods for gamut bounded saturation adaptive color enhancement are provided. Color enhancement incorporating gamut bounded saturation enhances colors of an pixel from a source color gamut such that the resulting color is within a target color gamut. This resulting color may, for example, take advantage of an expanded target color gamut of a display. Gamut bounded saturation may be implemented independently or in combination with RGB bounded saturation.

20 Claims, 12 Drawing Sheets

(56) References Cited

U.S. PATENT DOCUMENTS

| | | |
|---|---|---|
| 2003/0001860 A1 | 1/2003 | Yamazaki |
| 2003/0012433 A1* | 1/2003 | Gruzdev et al. ............... 382/167 |
| 2004/0023997 A1* | 2/2004 | Neustadt et al. ............... 514/267 |
| 2004/0170319 A1* | 9/2004 | Maurer ........................ 382/167 |
| 2004/0239814 A1* | 12/2004 | Hirashima et al. ............ 348/649 |
| 2005/0105147 A1* | 5/2005 | Gruzdev et al. ............... 358/518 |
| 2005/0219574 A1* | 10/2005 | Ok et al. ........................ 358/1.9 |
| 2006/0072133 A1 | 4/2006 | Han et al. |
| 2008/0068510 A1* | 3/2008 | Kanai ........................... 348/672 |
| 2009/0041341 A1* | 2/2009 | Scheibe ........................ 382/162 |
| 2009/0066978 A1* | 3/2009 | Stevens ........................ 358/1.9 |
| 2010/0033494 A1* | 2/2010 | Klompenhouwer et al. . 345/590 |

\* cited by examiner

SYSTEM AND METHODS FOR GAMUT BOUNDED SATURATION ADAPTIVE COLOR ENHANCEMENT

CROSS-REFERENCE TO RELATED APPLICATION

This application claims the benefit under 35 U.S.C. §119(e) of U.S. Provisional Application No. 61/187,049, filed Jun. 15, 2009 which is hereby incorporated by reference herein in its entirety.

This application is related to U.S. patent application Ser. No. 11/295,882, which was filed on Dec. 7, 2005, entitled "INTELLIGENT SATURATION OF VIDEO DATA." This application is related to U.S. patent application Ser. No. 11/296,185, which was filed on Dec. 7, 2005, entitled "COLOR MANAGEMENT UNIT." This application is related to U.S. patent application Ser. No. 11/296,163, which was filed on Dec. 7, 2005, entitled "INTELLIGENT COLOR REMAPPING OF VIDEO DATA." The disclosures of these applications are all hereby incorporated by reference in their entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Color enhancement is a common processing task used in video equipment and displays. The color enhancement is usually performed on digital video data using logic implemented by dedicated hardware on an application-specific integrated circuit (ASIC). Such an implementation necessitates that the enhancement function be easy to implement and not cause any side effects in terms of artifacts that would be visible in the enhanced image. Typical improper color enhancement artifacts include banding or clipping artifacts or loss of detail in the displayed image.

Digital video is widely available in YCbCr or YUV color spaces and thus it is common to perform the color enhancement in these color spaces. Conventional color enhancement processes include changing the brightness, contrast, saturation and hue of the pixels in an image. Adaptive color enhancement schemes selectively enhance certain colors in an image, e.g. blue in the sky and green in the grass, while at the same time preserving other colors, e.g., skin colors.

In typical adaptive color enhancement schemes, valid color values are calculated for each pixel, i.e. the resulting red, green and blue values of the pixel are within valid range, e.g. between 0 and 1 in the normalized range of values. However, this approach does not ensure that the resulting color is displayable on any particular digital display, since the digital display has its own set of color constraints. The color constraints of a digital display are often specified in terms of the color gamut of the display.

A color gamut refers to the subset of colors which can be accurately represented in a given circumstance, such as within a given color space or by a certain output device. If the display color space gamut (or any other target color space gamut) is not taken into account during color enhancement, it is possible that a pixel would be in valid range within a particular color space from a numerical viewpoint, but the pixel may not be displayable in the color gamut. A clipping artifact can occur when a pixel that is not displayable in a color gamut is clipped to the boundary of the color gamut. Similarly, a banding can occur when two colors that were close in the unenhanced state become spaced farther apart due to the color enhancement. Another artifact of color enhancement is a coloration artifact in which achromatic colors show coloration after color enhancement. Even when typical color enhancement processes attempt to reduce the occurrence of these and other color enhancement artifacts, they do not take into account potential variations between color gamuts and therefore cannot prevent any of the artifacts that occur when some of the color enhanced pixels cannot be accurately represented within a particular color gamut.

In addition, typical color enhancement techniques do not take into account the differences between the color gamut of a digital video content source and the color gamut of a digital video content display. Digital video content is often constrained to a small color gamut due to the acquisition systems involved in the formation of such content. The compression schemes that are used for the storage and delivery of such digital video content also often use a small color gamut. Most of the current video content is rendered for conventional CRT displays. Conventional CRT displays use a standard sRGB color gamut. More modern display devices such as LCD displays have emerged with a much larger color gamut relative to sRGB. Viewers do not get the benefit of the extended gamut displays if the sRGB content is rendered on the extended gamut displays.

SUMMARY

In view of the foregoing, systems and methods for gamut bounded saturation adaptive color enhancement of an input pixel associated with a source color gamut for display on a device associated with a target color gamut are provided.

In some embodiments a pixel associated with a chrominance value is received. A maximum source chrominance value is determined for the pixel based on the source color gamut. A maximum target chrominance value for the pixel is determined based on the target color gamut. A gamut bounded saturation value is calculated based on the chrominance value of the pixel, the maximum source chrominance value, and the maximum target chrominance value. The pixel chrominance value is then adjusted based on the gamut bounded saturation value.

In some embodiments, the maximum source chrominance value is determined by accessing a source gamut boundary description look-up table and the maximum target chrominance value is determined by accessing a target gamut boundary description look-up table. The source and the target gamut boundary description look-up tables store maximum chrominance values for every pair of luminance and hue values.

In some embodiments, the source and the target gamut boundary description look-up tables may be computed. The source and the target gamut boundary description look-up tables may be computed by initializing a gamut boundary description array and looping through a predetermined set of RGB values. For each RGB value in the predetermined set of RGB values: (a) the RGB value is transformed from an RGB color space into an LCH value in an LCH color space, where the LCH value includes a luminance value, a chrominance value, and a hue value, (b) a maximum chrominance value stored in the gamut boundary description array associated with the luminance value and the hue value is compared with the chrominance value of the LCH value, and (c) the chrominance value of the LCH value is stored in the gamut boundary description array when the chrominance value of the LCH value is larger than the maximum chrominance value.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure generally relates to systems and methods for gamut bounded saturation adaptive color enhancement, and more particularly to systems and methods for processing pixels within an image or a frame of video and applying adaptive color enhancement to those pixels based on source and target color gamuts. Gamut bounded saturation parameters may be selected in accordance with the disclosed systems and methods such that a resulting enhanced image can be mapped from the source color gamut to the target color gamut. In some embodiments, adaptive color enhancement from a source color gamut to a target color gamut ensures that the enhanced pixels are valid within the target color gamut. In some embodiments, adaptive color enhancement from a source color gamut to a target color gamut generates a resulting image that has an expanded color gamut relative to the unenhanced image.

Figure 1:
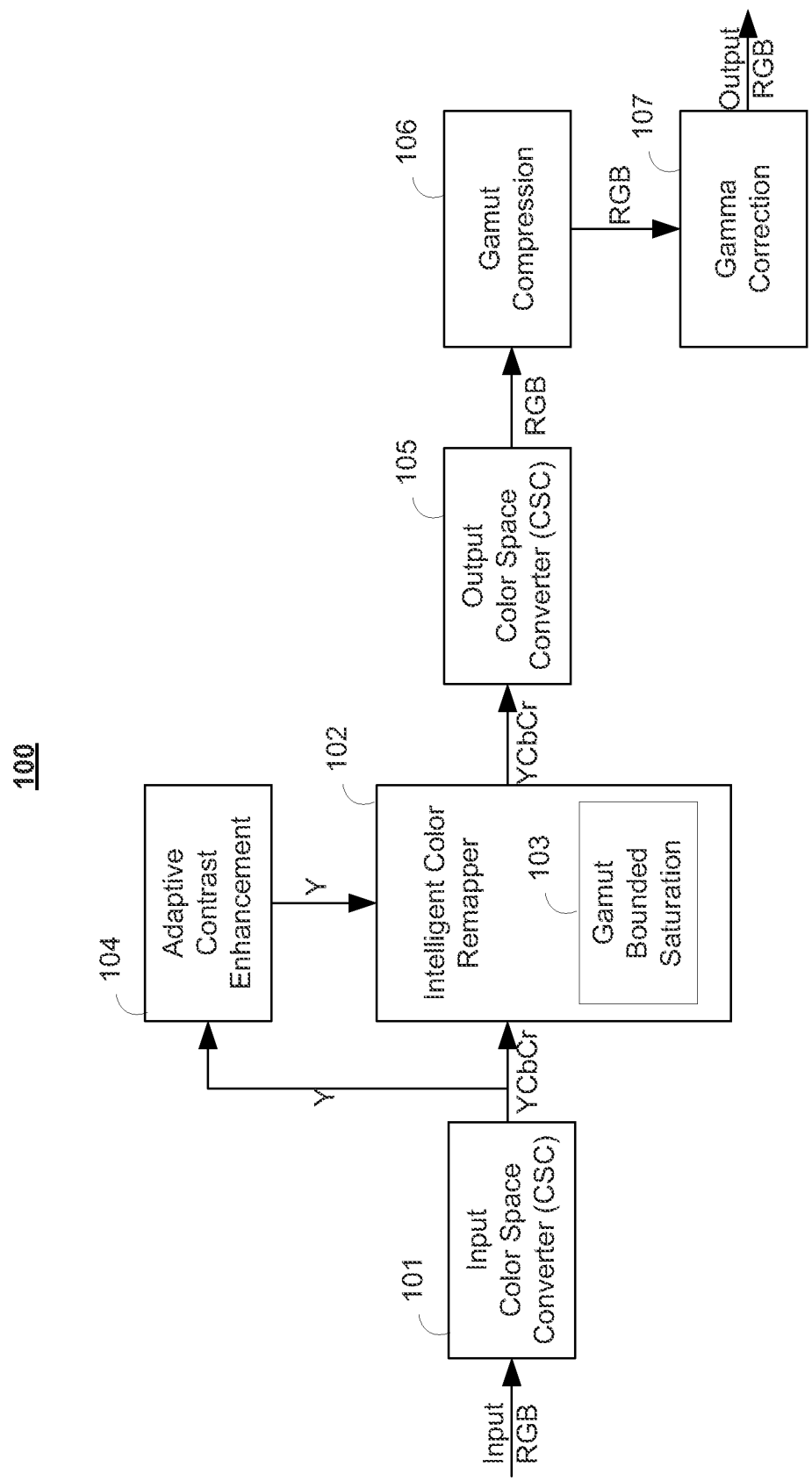
FIG. 1 shows an illustrative block diagram of a color management unit including gamut bounded saturation in accordance with an embodiment of the present disclosure.

FIG. 1 shows an illustrative block diagram of a color management unit (CMU) 100. CMU 100 includes input color space converter (CSC) 101, intelligent color remapper 102, adaptive contrast enhancement 104, output CSC 105, gamut compression 106, and gamma correction 107. Intelligent color remapper 102, which includes gamut bounded saturation 103, enhances the selected colors and ensures that the enhanced colors are within a target color gamut. CMU 100 may be implemented in a single integrated circuit or on multiple integrated circuits. CMU 100 may be implemented in an application-specific integrated circuit (ASIC) and/or a programmable logic device.

Figure 4:
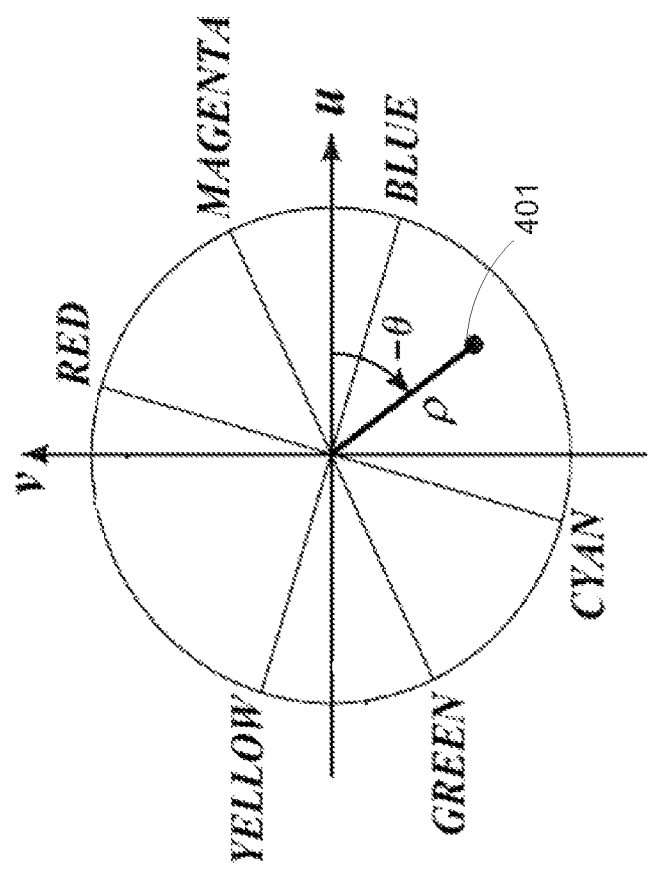
FIG. 4 shows an illustrative YUV color plane wheel and the calculation of hue and chrominance for an example of a YUV pixel within the color plane in accordance with an embodiment of the present disclosure.

Input CSC 101 converts an input video signal to a desired color space, if necessary. As illustrated in FIG. 1, an RGB signal is input to input CSC 101. Digital video content is commonly represented in RGB color space. In RGB color space, each pixel may be represented using three basic color components, namely red (R), green (G), and blue (B). High quality digital video can be represented, for example, using 24 to 30 bits per pixel, 8 to 10 bits for each of the color components of the pixel. Input CSC 101 can convert an RGB input signal into a YCbCr signal. The YCbCr color space is typically used for color management because luminance and color information are separate and can be processed independently. "Y" is the luminance (also referred to as luma) of the video while "Cb" and "Cr" are chroma or color components. In an 8-bit system, Y, Cb, and Cr are assigned values ranging from 0 to 255. When an offset of 128 is removed from Cb and Cr, the YCbCr space is referred to as the YUV color space. The value of U is the offset removed representation of Cb and the value of V is the offset removed representation of Cr. Although transmission of video data is often more convenient in YCbCr form (due to the unsigned nature of data), most color enhancement operations are usually defined in terms of U and V components. Referring to the YUV color plane wheel shown in FIG. 4, the location of UV vector 401 determines the hue (color) of the pixel. The three primary colors red, green, and blue and their complementary colors yellow, magenta, and cyan are spaced out circularly in the U-V plane with a separation of approximately 60°.

Adaptive contrast enhancer 104 can be used to apply contrast enhancement to the luma (Y) component of the signal. Output CSC 105 can be used to convert the video signal to a desired color space, after enhancement by intelligent color remapper 102. For example, as shown in FIG. 1, the video signal may be converted from YCbCr color space back into RGB color space, after enhancement. Gamut compression 106 may be used to maintain pixel validity during color space conversion. For example, gamut compression 106 may correct out-of-range pixels that may be provided at the output of output CSC 105. Gamma correction 107 may be used to compensate for nonlinear characteristics of an output display. For example, gamma correction 107 may change the gamma of the video using a look up table. The operation of intelligent color remapper 102 and gamut bounded saturation 103 will be described in greater detail below. Additional details about the other elements of CMU 100, including the conversion between RGB, YUV, and YCbCr color spaces, is described in U.S. patent application Ser. No. 11/296,185, which was filed on Dec. 7, 2005, entitled "COLOR MANAGEMENT UNIT," which is incorporated by reference herein.

Figure 2:
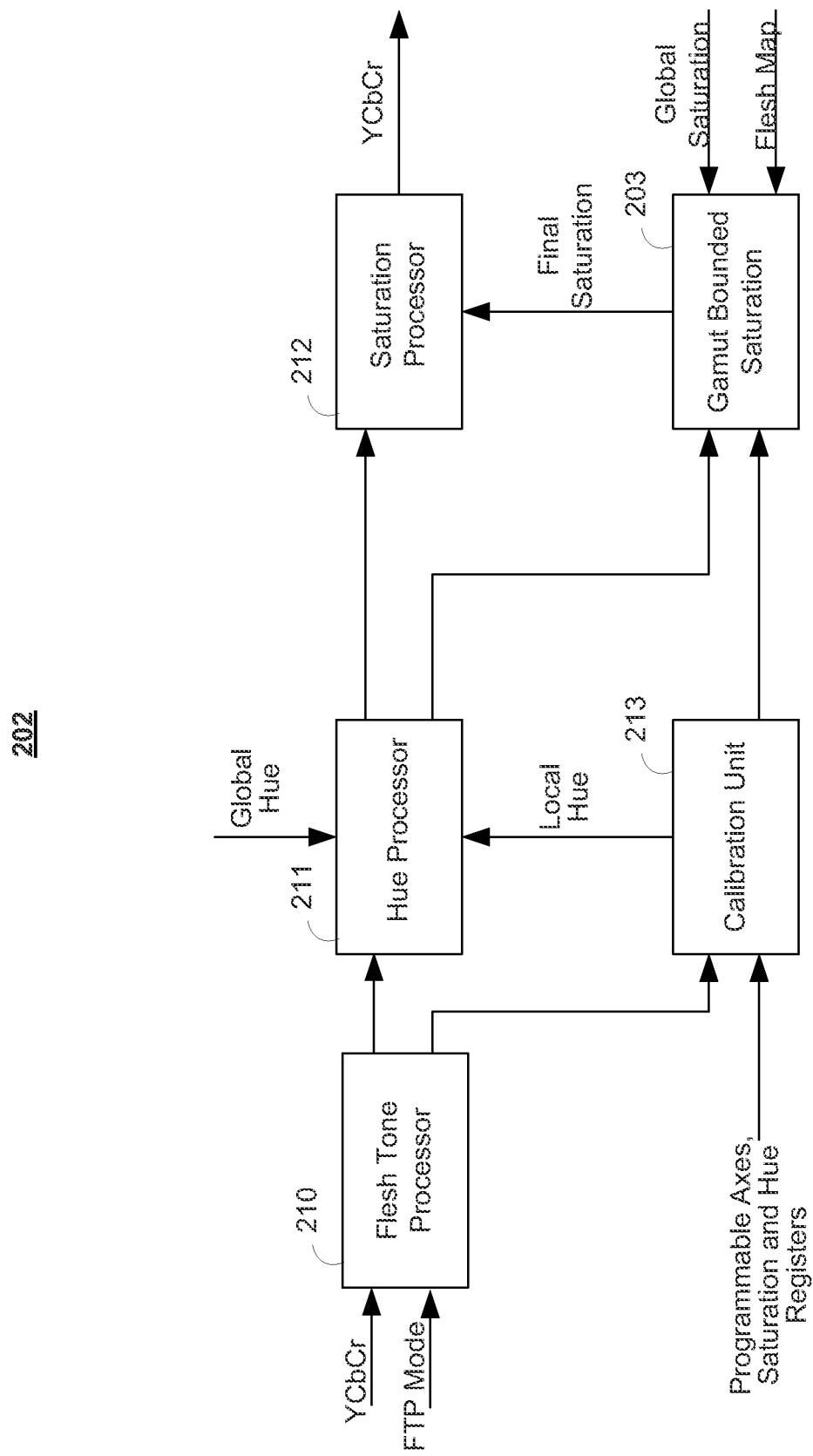
FIG. 2 shows an illustrative block diagram of a intelligent color remapper including gamut bounded saturation in accordance with an embodiment of the present disclosure.

FIG. 2 shows an illustrative block diagram of intelligent color remapper 202 including gamut bounded saturation 203. Intelligent color remapper 202 may be implemented in a single integrated circuit or on multiple integrated circuits. Intelligent color remapper 202 may be implemented in an application-specific integrated circuit (ASIC) and/or a programmable logic device.

Intelligent color remapper 202 and gamut bounded saturation 203 may be the same as or similar to intelligent color remapper 102 and gamut bounded saturation 103 of FIG. 1. Flesh tone processor 210 receives an input YUV pixel and detects flesh tones and corrects the flesh tones. Hue processor 211 receives an input pixel and transforms the hue of the input pixel in response to local and/or global hue values and a global hue change values. Saturation processor 212 receives a pixel and transforms the saturation of the input pixel in response to the final saturation value. Calibration unit 213 receives programming information for controlling system 100 from, for example, an on-screen display (OSD), control registers, and the like. Calibration unit 213 may determine local hue and local saturation values in response to the programming information and an input pixel. Additional details about the various elements of intelligent color remapper 102, including flesh tone processor 210, hue processor 211, saturation processor 212, and calibration unit 213, are described in U.S. patent application Ser. No. 11/296,163, which was filed on Dec. 7, 2005, entitled "INTELLIGENT COLOR REMAPPING OF VIDEO DATA," and U.S. patent application Ser. No. 11/295,882, titled which was filed on Dec. 7, 2005, entitled "INTELLIGENT SATURATION OF VIDEO DATA," both incorporated by reference herein. In these prior applications, a final saturation parameter is generated within an RGB bounded saturation block. This RGB saturation block can determine, after the adjustment of saturation values, whether the resulting R, G, and B values for a pixel are within a valid range or not. If any of the R, G and B values is not within a valid range, the RGB bounded saturation block, will move the RGB triplet to ensure that the resulting color components are within valid range and that hue shift is not introduced in this process.

Figure 3:
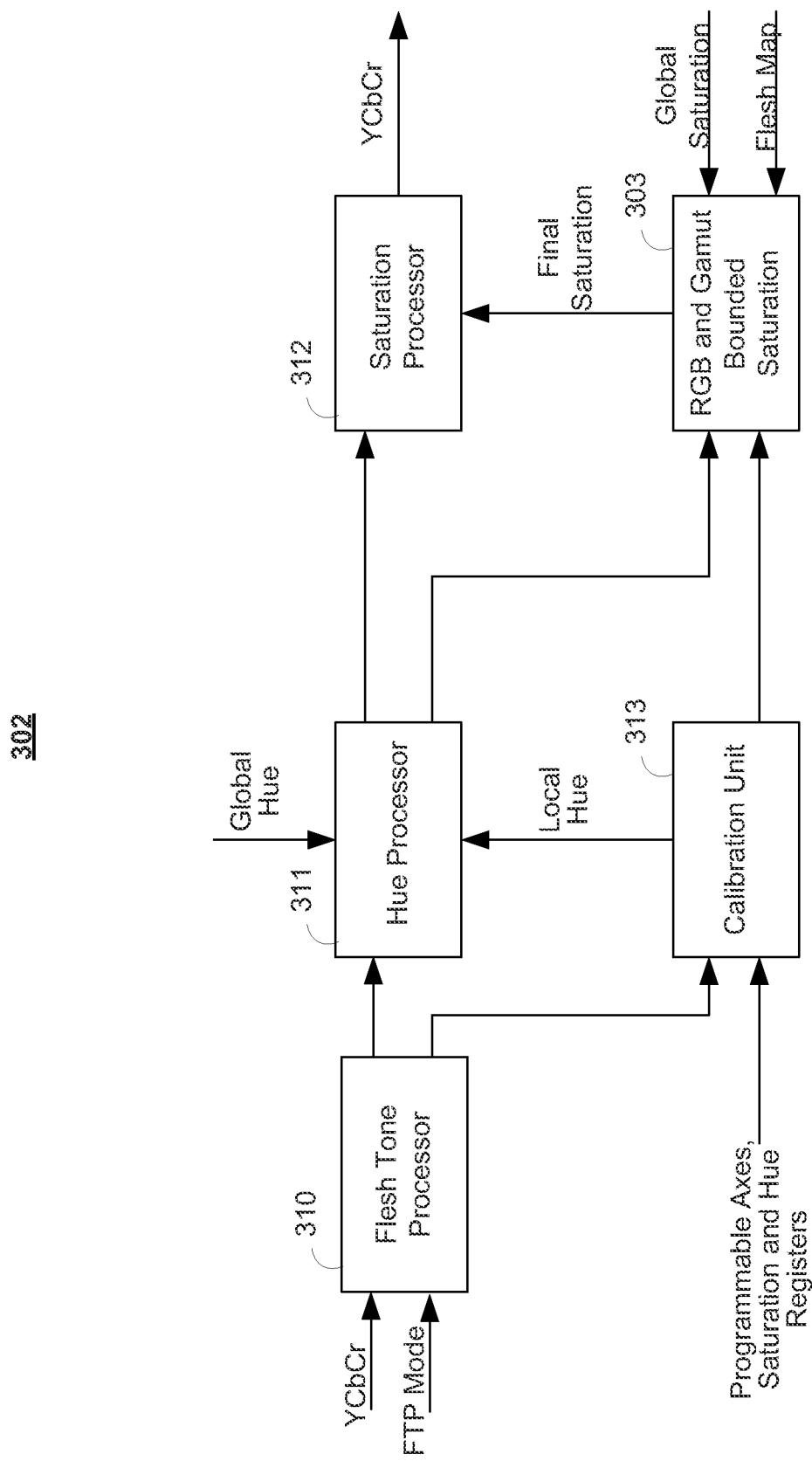
FIG. 3 shows an illustrative block diagram of a intelligent color remapper including RGB and gamut bounded saturation in accordance with an embodiment of the present disclosure.

In the various embodiments of the present disclosure and as illustrated by intelligent color remapper 202 of FIG. 2, gamut bounded saturation 203 is used to compute a final saturation value based on source and target (e.g., display) gamut constraints. FIG. 3 shows an illustrative block diagram of intelligent color remapper 302 including RGB and gamut bounded saturation 303. Intelligent color remapper 303 of FIG. 3 may be similar to intelligent color remapper 203 of FIG. 2, except gamut bounded saturation 203 is replaced by RGB and gamut bounded saturation 303. Intelligent color remapper 302 may be implemented in a single integrated circuit or on multiple integrated circuits. Intelligent color remapper 302 may be implemented in an application-specific integrated circuit (ASIC) and/or a programmable logic device.

In applications where there is no knowledge of the target color gamut of a display, such as in color enhancement function within a DVD player, RGB and gamut bounded saturation 303 of FIG. 3 may only use an RGB bounded saturation function to calculate a final saturation value. However, where source and target color gamuts are known, the gamut bounded saturation function of RGB and gamut bounded saturation 303 of FIG. 3 can be enabled as well.

Changing the saturation value of a pixel in the YUV color space (and in the YCbCr color space) is challenging because not every YUV triplet value maps into an equivalent valid RGB triplet. For example, when an invalid 10-bit YUV triplet is converted into an RGB triplet, one or more of the R, G, or B values may go out of the 0-1023 valid range (assuming 10 bit data for R, G and B) and may be clamped at a high or low value. Furthermore, even if the converted RGB values are in a numerically valid range, they may become invalid after mapping to the target color gamut of an output display. As a result of invalid mappings, there can be a change of hue and brightness of an enhanced image—i.e., colors may start to look different and unnatural and details may be lost. RGB and gamut bounded saturation 303 of FIG. 3 solves this problem in two ways. First, source and target color gamut descriptions are used to limit the final saturation—this is referred to as gamut bounded saturation. Second, another saturation limit is computed to prevent the final RGB values from falling out of range—this is referred to as RGB bounded saturation. As illustrated in FIGS. 2 and 3, gamut bounded saturation can be implemented independently (FIG. 2) or in combination with RGB bounded saturation (FIG. 3) or any other suitable saturation bounding function.

Color gamut boundary descriptions for source and target color gamuts may be stored in pre-defined look up tables (LUT). For example, gamut bounded saturation 203 (FIG. 2) and RGB and gamut bounded saturation 303 (FIG. 3) may contain one or more memory blocks (not shown) that store one or more gamut boundary description look-up tables. The number and type of color gamut boundary descriptions stored in a device may depend on the functionality of the device. For example, a display device may contain only a single target color gamut boundary description that corresponds to the color gamut of the display, but may contain multiple source color gamut boundary descriptions corresponding to the different video sources that may be provided to the display. Similarly, a DVD player may not contain any target color gamut boundary descriptions because the DVD player is meant to work with displays having any color gamut. Alternatively, the DVD player may contain multiple target color gamut boundary descriptions in order to provide a video output that can be selectively enhanced for different display types.

The gamut boundary descriptions may be defined in LCH (Luma/Chroma/Hue) color space. LCH color space is a display independent color space. LCH color space and its components can be described with respect to the YUV color wheel shown in FIG. 4.

Color vector 401 represents a pixel in the YUV/LCH color space. The pixel's hue (color) is determined by calculating the angle θ. The chroma ρ of the pixel indicates how vivid the color is. If the chroma is zero, the pixel is a gray level value. A higher chroma value indicates a more vivid or saturated color. The hue of the pixel may be changed by rotating color vector 401 about the origin. The saturation of the pixel can be modified by moving color vector 401 closer to or away from the origin. As used herein, saturation value or saturation factor is a positive multiplying factor. For example, the saturation value may range from 0 to 5. A saturation value that is less than one will decrease the colorfulness of a pixel, while a saturation value that is greater than one will increase the colorfulness of the pixel. As will be described in greater detail below, gamut bounded saturation may determine a valid saturation value for a pixel based on a source color gamut and a target color gamut. This gamut bounded saturation value may be computed to be a target or desired saturation value or may be computed to be a maximum saturation value.

The gamut boundary descriptions store a maximum chroma (C) value for every combination of hue (H) and luma (L) values. Since color gamuts of sources and targets may be known apriori and generally do not change, predefined gamut boundary description tables can be computed offline prior to use by a gamut bounded saturation block (FIGS. 2 and 3). There may be circumstances where real time computation of gamut boundary description tables may be desirable. For example, if gamut bounded saturation is performed inside an ASIC that is part of a DVD player, a TV that is connected to the DVD player (e.g., via an HDMI interface) may send its gamut boundaries to the DVD player. The DVD player may then compute gamut boundary description tables based on the received gamut boundaries.

Figure 5:
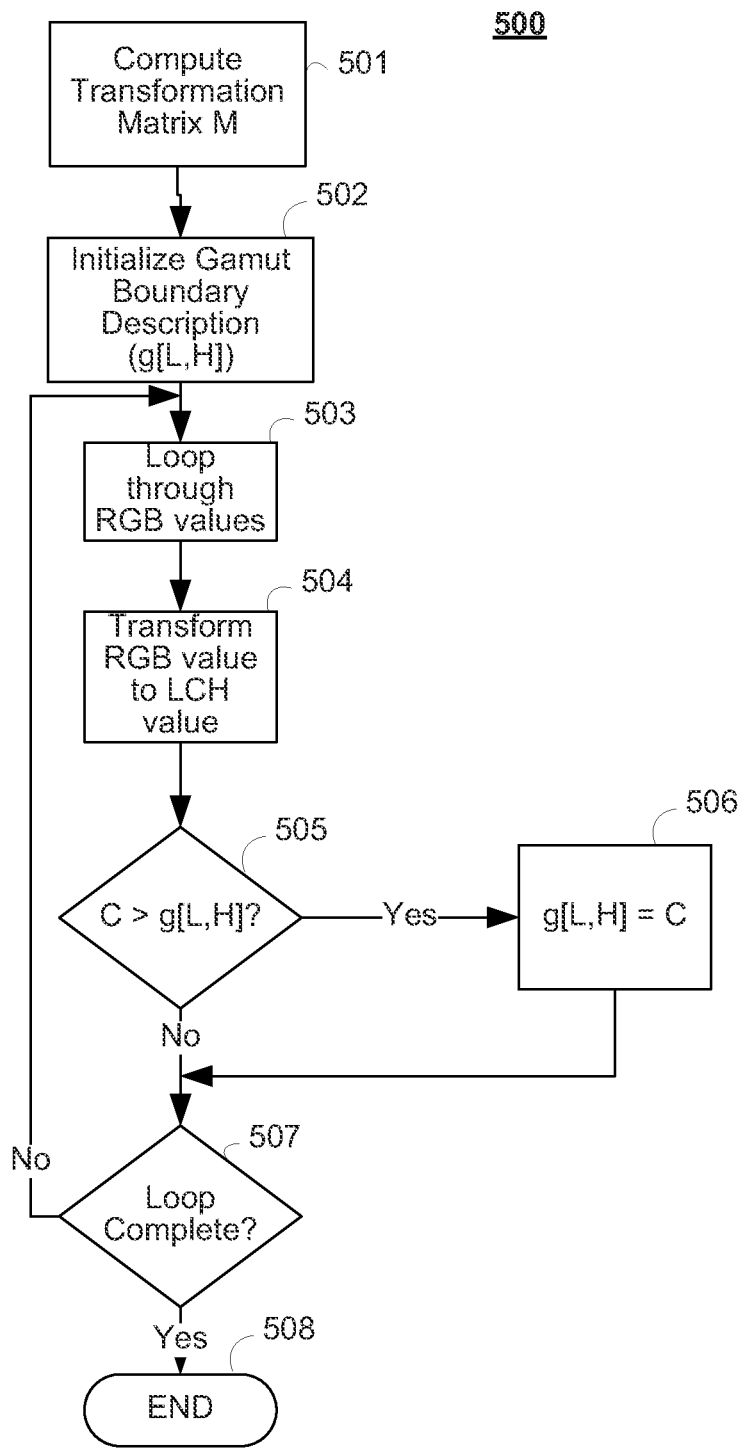
FIG. 5 shows an illustrative flowchart of a process for computing a gamut boundary description table for a source or target color gamut in accordance with an embodiment of the present disclosure.

FIG. 5 shows an illustrative flowchart of process 500 for computing a gamut boundary description table for a color gamut. Process 500 may be used to compute gamut boundary descriptions for both source and target color gamuts. At 501, a transformation matrix M can be computed to transform RGB color space to XYZ color space. Let $(X_R, Y_R)$, $(X_G, Y_G)$ and $(X_B, Y_B)$ be the chromaticities of the color gamut for (R=1, G=B=0), (R=0, G=1, B=0) and (R=G=0, B=1), respectively. Let $(X_W, Y_W)$ be the white point for the color gamut. Using these eight parameters, a 3×3 transformation matrix, M, can be computed to transform RGB to XYZ color space. This procedure is well known in color science literature and need not be described in detail here. Note that if the color gamut conforms to a standard (e.g., sRGB), then the eight parameters may be known apriori. In the case of a target color gamut for a display, the eight parameters can be measured using a colorimeter.

At 502, a two-dimensional gamut boundary description array g[L,H] can be initialized. The source color space gamut boundary description may be designated as $g_s$[L,H] and the target color space gamut boundary description may be designated as $g_t$[L,H]. Gamut boundary description g[L,H] represents a maximum chrominance value, $C_m$, of the color space for every pair of luminance and hue values (L,H). During this initialization the chrominance values stored in g[L,H] may be set to zero. In one illustrative embodiment, L can range from 0 to 100 and H can range from 0 to 359. However, any suitable range may be used.

At 503 through 507 a loop through a predetermined set of RGB values is performed. For example, in one embodiment, the loop includes all of the surface colors of a unit RGB color cube. In this embodiment, the loop would include the range of all RGB values G and B with the minimum and maximum values of R, the range of all RGB values R and B with the minimum and maximum values of G, and the range of all RGB values R and G with the minimum and maximum values of B. At 504, the current RGB value in the RGB color space is transformed into an LCH value in the LCH color space. This transform may be computed directly or using a series of transformations. For example, an RGB color space value may be transformed into an XYZ color space value using transformation matrix M, the XYZ color space value may be transformed into an Lab color space value, and the Lab color space value may be transformed into an LCH color space value. The transformation from XYZ color space into Lab color space and from Lab color space into LCH color space are well known in the art. At 505, the current value of C is compared to the value of $C_m$ stored in g[L,H]. If the current values of C is larger, at 506, the current value of C is stored in g[L,H]. After the loop through the RGB values is complete, and the maximum chrominance values are stored in g[L,H], the loop ends at 508.

After process 500 is completed for a color space, the entries of g[L,H] are the maximum chrominance values for each corresponding pair of luminance and hue values. This gamut boundary description may then be used in a gamut bounded saturation computations (e.g., FIG. 2, 203) to determine a saturation value for an input pixel based on the luminance and hue values of that pixel. Note that in process 500, the color values are specified in the degamma working space, i.e. it is assumed that the color values do not have a gamma curve characteristic. The notion of colorspace transformations in linear space rather than in gamma working space is well understood and is not addressed here.

Gamut boundary descriptions for both source and target color ($g_d$[L,H] and $g_d$[L,H]) may be maintained as a set of two-dimensional look up tables. The size of these tables may depend on the sampling resolution of the surface colors of the unit RGB color cube. Very fine sampling of the surface colors may be preferred for a good representation of the source and display gamut boundaries. For example, to generate these tables, a loop may be run over all the surface RGB values as described above. In general, RGB values are integers in the range [0-255] or [0-1023]. However, very fine sampling may use fractional RGB values in the loop so that the gamut boundaries are represented in finer detail. However, very fine sampling may result in large look up tables that may increase storage requirements and processing complexity. In some embodiments, the size of the look up tables and the complexity of the implementation may be reduced by applying a low-pass filter to the gamut boundary description values. This may result in a smoother representation of the final look-up table entries for $g_s$[L,H] and $g_t$[L,H] and this in turn may improve the performance of the overall color enhancement process.

Figure 6:
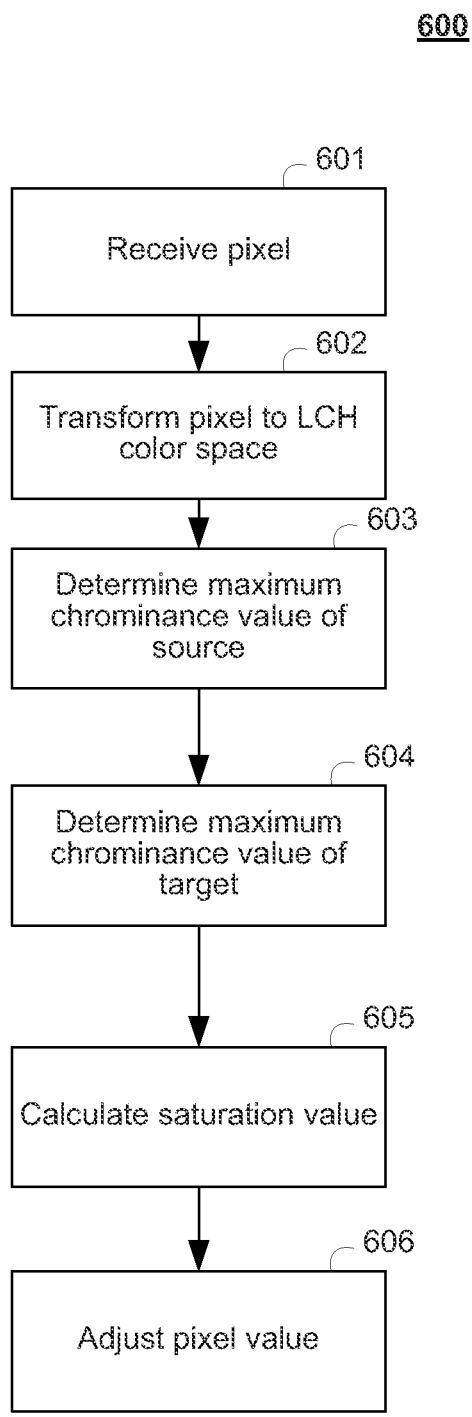
FIG. 6 shows an illustrative flowchart of a process for adjusting a pixel value using gamut bounded saturation based on a source color gamut and a target color gamut in accordance with an embodiment of the present disclosure.

FIG. 6 shows an illustrative flowchart of process 600 for adjusting a pixel value using gamut bounded saturation based on a source color gamut and a target color gamut. Process 600 may be used to determine a saturation value for each input pixel. This saturation value may be used to enhance the color of the pixel while ensuring that the enhanced pixel is within the target color gamut of a display. At 601, an input pixel is received. This input pixel is associated with a source color gamut. At 602, the pixel can be converted to LCH color space. For example, this transformation may include a series of transformations from YUV or YCbCr color spaces to RGB color space, from RGB color space to XYZ color space, from XYZ color space to Lab color space, and finally from Lab color space to LCH color space. The RGB to XYZ transformation may use the 3×3 M matrix described above with respect to process 500 (FIG. 5). The transformation processes from one color space to another are well known in color science literature and are therefore not addressed in further detail here. Note that it may be assumed that the input pixel color that is represented in YCbCr color space is in gamma working space. This assumption can be made because the underlying digital image content, which is in the form of 8 or 10 bit digital codes for each color component, has undergone a mapping from a linear spacing of the values representative of the digital codes to a spacing that is transformed via a gamma characteristic. The concept of gamma is well understood in color science and is not discussed further here. Prior to the above mentioned color space transformations from YCbCr to LCH, a degamma function may be applied to remove the effect of gamma on the content. This may be done via a simple one dimensional look-up table using entries that are based on an assumed gamma value for the input content. The actual value of gamma is often not directly available since there may not be metadata information in the input content stream which specifies the gamma value that was used initially to map the content from liner working space to gamma working space. It should be understood than any other suitable color space transformations may be performed, if necessary. In some embodiments, the input pixels may be in the desired color space and no color space transformation may be required.

At 603, using L and H as index values, the maximum chroma values of the source color space, $C_{sm}=g_s[L,H]$, is determined. At 604, using L and H as index values, the maximum chroma values of the target color space, $C_{tm}=g_t[L,H]$, is determined. In some embodiments, the target color space may be the color space of a display. Gamut boundary descriptions, $g_s[L,H]$ and $g_t[L,H]$ may be computed as needed using process 500 (FIG. 5) or may be computed in advance and stored in one or more look-up tables. At 605, a saturation value may be computed as a function of $C_{sm}$, $C_{tm}$, and the input pixel's chrominance C. This computation will be described in greater detail below.

At 606, the value of the input pixel is adjusted based on the computed saturation value. This saturation value can be used in one of two ways—the saturation value may be a maximum saturation value, used to "clamp" the saturation axis (this mode of operation is referred to as the "parallel configuration") or the saturation value may be a target saturation value, used to boost the saturation axis to a desired value (this mode of operation is referred to as the "series configuration.") These two configurations will be discussed below with respect to FIGS. 11 and 12. The output of process 600 is a color enhanced pixel whose color is within the target color gamut, such as the color gamut of a display. As illustrated in FIG. 1, if additional color space transformations are applied to the received input pixel, gamut compression may be used to bring the resulting RGB pixel value within valid range. Furthermore, if the individual color channels need to include a gamma transformation, then the gamma correction function may need to be applied as well. Details of the gamut compression and gamma correction functions are described in U.S. patent application Ser. No. 11/296,185, which was filed on Dec. 7, 2005, entitled "COLOR MANAGEMENT UNIT," which is incorporated by reference herein.

It should be noted that the flowcharts of processes 500 (FIG. 5) and 600 (FIG. 5) are merely illustrative. Any of the described elements may be modified, removed, or combined, or any additional elements may be added, without departing from the scope of the present disclosure. Processes 500 and 600 may be implemented in a single integrated circuit or on multiple integrated circuits. Processes 500 and 600 may be implemented in an application-specific integrated circuit (ASIC) and/or a programmable logic device. Processes 500 and 600 may be implemented, in whole or in part, within the gamut bounded saturation blocks of FIGS. 1-3.

Figure 7:
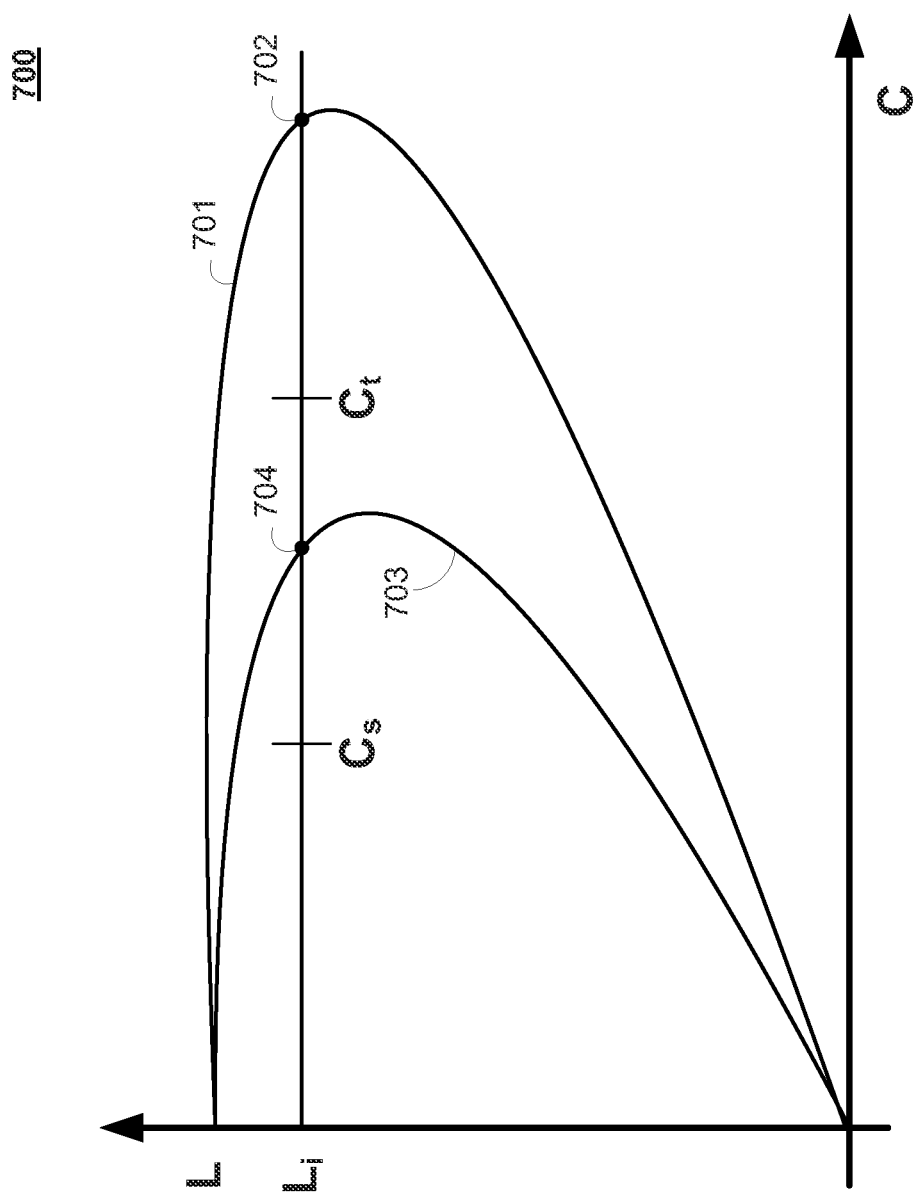
FIG. 7 shows an illustrative graph of a two-dimensional slice of source and target gamut boundaries in Luma-Chroma space for a fixed hue angle in accordance with an embodiment of the present disclosure.

FIG. 7 shows an illustrative graph 700 of a two-dimensional slice of source and target gamut boundaries in Luma-Chroma space for a fixed hue angle H. These color gamuts are described in LCH color space. In general, the objective in color enhancement is not to produce hue shifts since this would cause a shift in colors, e.g. red would be converted to magenta. To avoid color shifts, these color enhancement mappings may be restricted to fixed hues only. In graph 700, curve 703 represents the luminance and chrominance characteristics of a source gamut $g_s[L,H]$ and curve 701 represents the luminance and chrominance characteristics of a target gamut $g_t[L,H]$, both curves having a common, fixed hue value.

In FIG. 7, $C_s$ is the chrominance value of an unenhanced input pixel in LCH color space and $L_i$ is the corresponding luminance value of the pixel. Saturation value calculation (605; FIG. 6) may calculate an enhanced chrominance value $C_t$ for the input pixel based on curves 703 and 701 mapped along constant luminance value $L_i$. Enhanced chrominance value $C_t$ may be calculated based on the maximum chrominance values for the source and target gamuts, $C_{sm}$ 704 and $C_{tm}$ 702. One reason for using this trajectory (i.e., a constant horizontal luminance value as opposed to other trajectories that are not horizontal), is that enhancements using this horizontal trajectory alter chrominance values without changing luminance values. According to the Helmholtz-Kohlrausch phenomenon, in which a viewer may perceive a color enhanced picture as also having increased brightness, it may be desirable to modify luminance values when performing color enhancements. In the current embodiment, however, contrast enhancement is performed separately from color enhancement (e.g., using adaptive contrast enhancement 104 (FIG. 1)). In this embodiment, an additional change in luminance during color enhancement may adversely affect the contrast of the image. In other embodiments, color enhancement using gamut bounded saturation may include changes in luminance value.

Let $$C_n = \frac{C_s}{C_{sm}}, C_n \in [0, 1].$$

$C_s$, the chrominance value of the unenhanced input pixel, is less than or equal to the maximum chrominance, $C_{sm}$ 704 for the current luminance value, $L_i$. $C_t$, the chrominance value of the enhanced input pixel, can be computed as a function of $C_n$ properly scaled by $C_{sm}$, i.e., $C_t=f(C_n)*C_{sm}$. Any number of different mapping functions can be can be used for $f(C_n)$, several of these mapping functions are depicted in FIG. 8.

Figure 8:
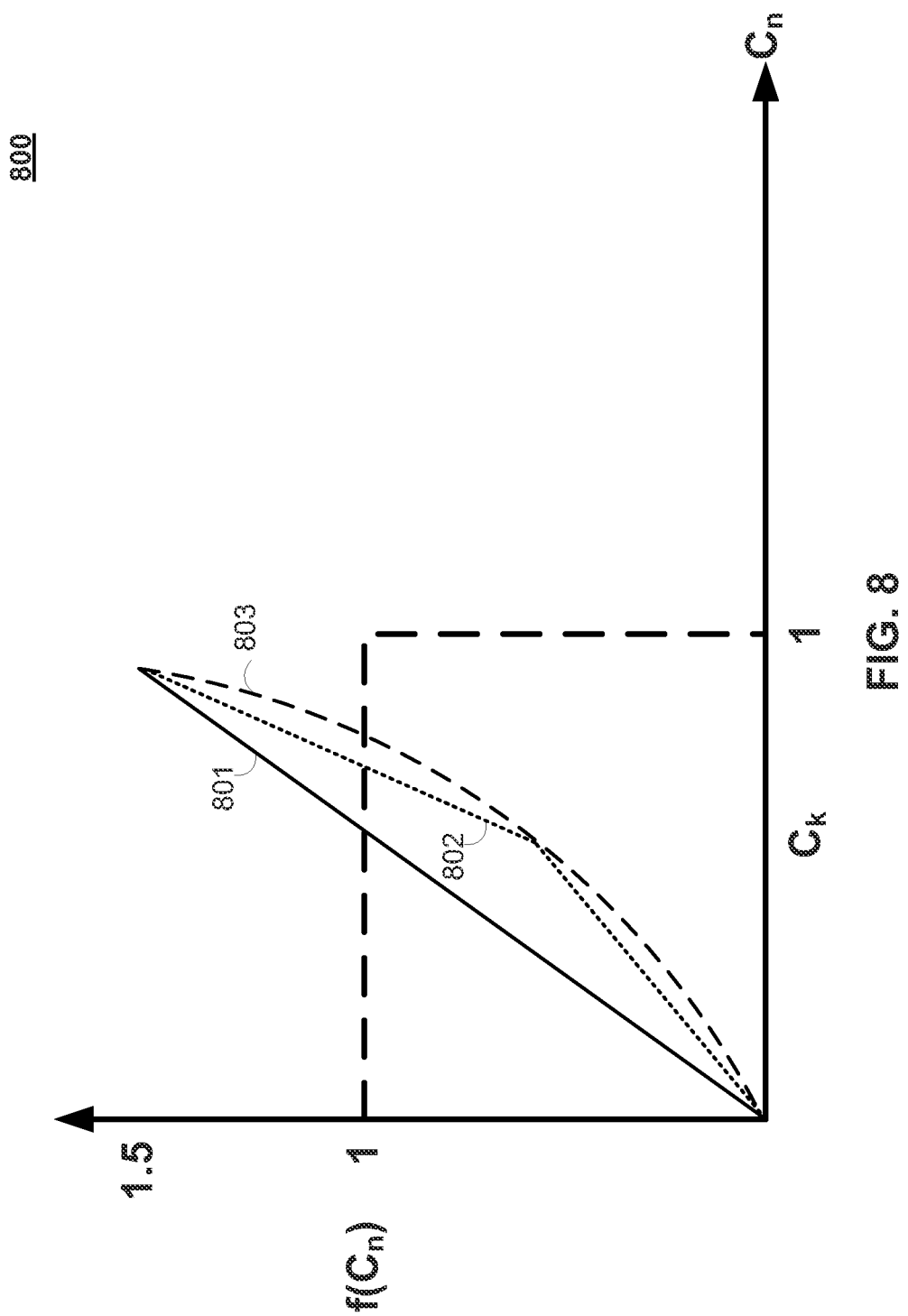
FIG. 8 shows an illustrative graph of three mapping functions used for mapping input chroma values to expanded output chroma values in accordance with an embodiment of the present disclosure.

A linear mapping function is illustrated in FIG. 8 as line 801.

Linear Mapping Function:

$$f(C_n) = C_n \frac{C_{tm}}{C_{sm}}.$$

Where the target color gamut is larger than the source color gamut, the slope of the liner mapping function is greater than one. Accordingly the enhanced chrominance value $C_t$ will be greater than unenhanced chrominance value $C_s$. An advantage of this mapping function is that it is a simple function. A disadvantage of this mapping function is that all chrominance values having the same luminance value (i.e., on line $L_i$ (FIG. 7)) will receive that same change in chrominance value.

A knee mapping function is illustrated in FIG. 8 as line 802.

Knee Mapping Function:

$$f(C_n) = C_n, 0 \le C_n \le C_k$$

$$= C_n + \left(\frac{C_n - C_k}{1 - C_k}\right)\left(\frac{C_{tm}}{C_{sm}} - 1\right), C_n > C_k.$$

This knee mapping function has two linear functions, the first has a slope of one and the second has a steeper slope. The second function expands the remaining range of the input chrominance values to an expanded range of output chrominance values. Here $C_k$ is a predetermined parameter. Typically $C_k$ will be assigned a small value in order to prevent coloration of pixels that are close to the L axis of FIG. 7. An illustrative setting is $C_k=0.1$.

A nonlinear mapping function is illustrated in FIG. 8 as line 803.

Nonlinear Function:

$$f(C_n) = C_n, 0 \le C_n \le C_k$$

$$= C_n + \left(\frac{C_n - C_k}{1 - C_k}\right)^g \left(\frac{C_{tm}}{C_{sm}} - 1\right), C_n > C_k.$$

Figure 9:
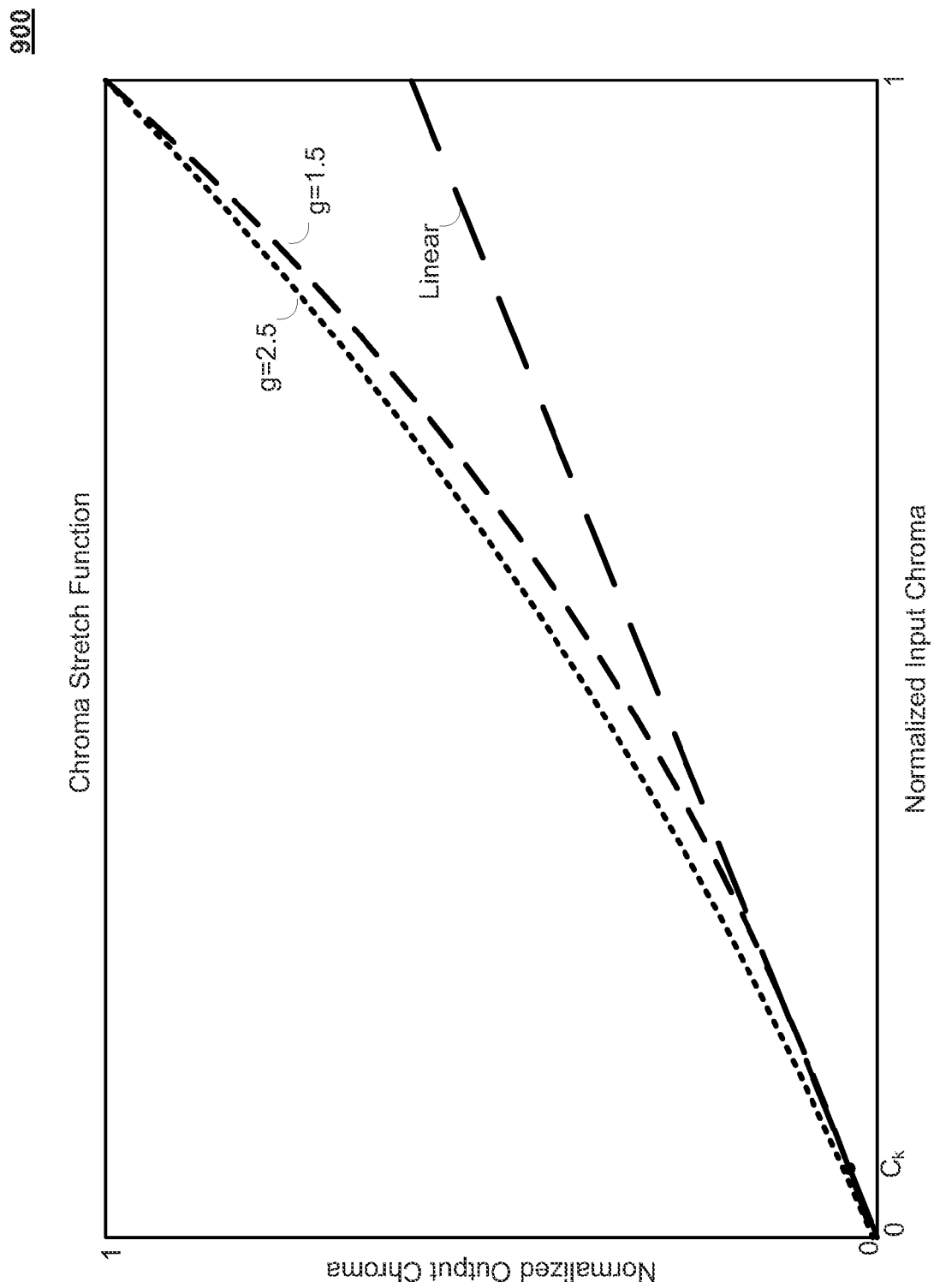
FIGS. 9 and 10 show illustrative graphs of nonlinear mapping functions in accordance with an embodiment of the present disclosure.
Figure 10:
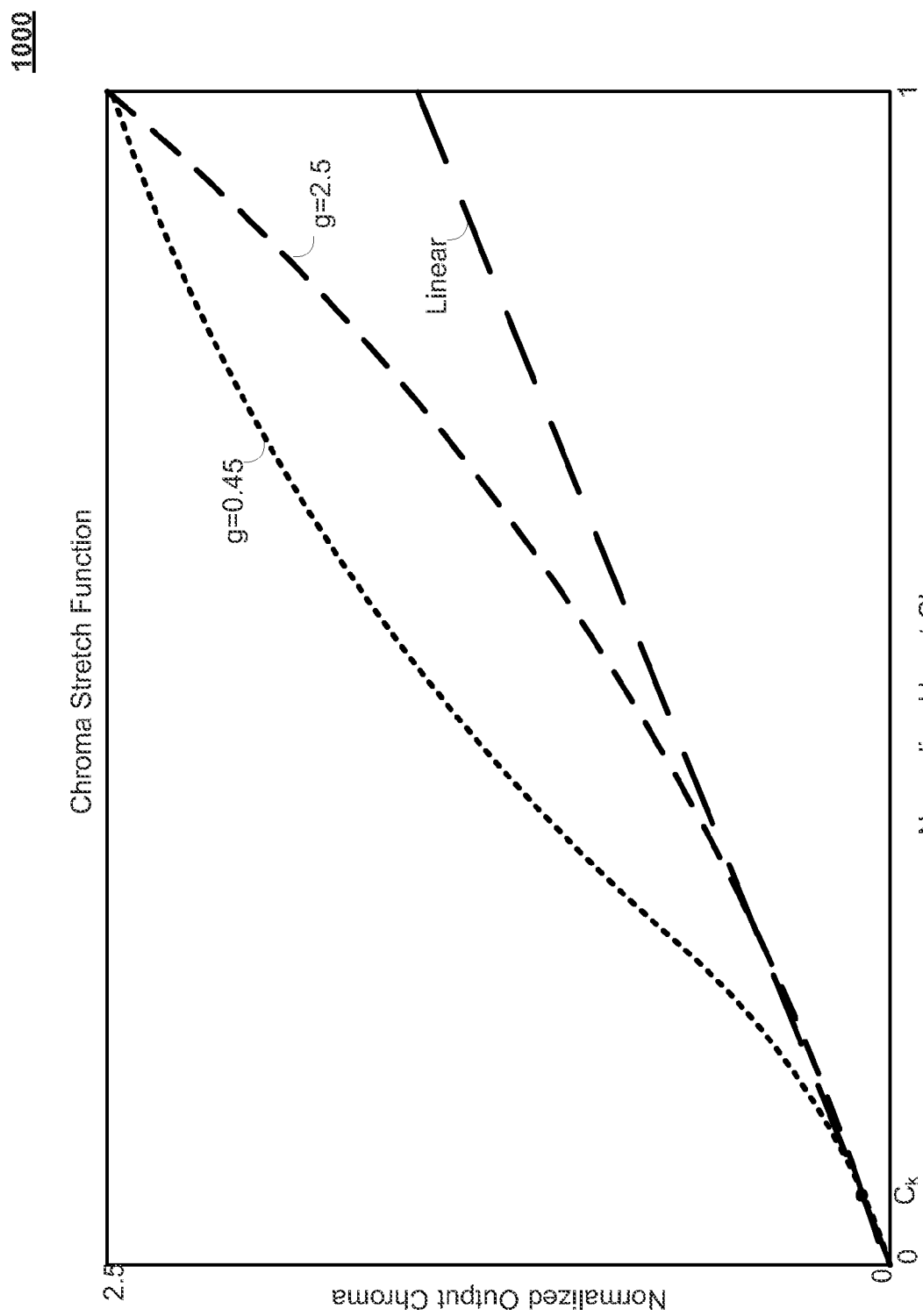

This function is linear up to the knee point $C_k$ and then grows exponentially based on the predetermined parameter g. This nonlinear mapping function has two degrees of freedom. It can preserve the colors that are near the L axis (FIG. 7) and colors that are farther away from the L axis can get a significant chrominance boost depending on the value of g. FIGS. 9 and 10 show illustrative nonlinear functions for various values of g as compared to linear functions. An illustrative setting is g=2.2.

In some embodiments, the output of mapping function $f(C_n)$ can be pre-calculated and stored in a look-up table for sampled values of input chrominance, $C_n$. For any value of $C_n$ and $C_{sm}$, an enhanced chrominance value in a target color gamut $C_t$ can be determined by calculating $f(C_n)$ or by using the look-up table for $f(C_n)$. A gamut bounded saturation value for an input pixel may be, $$maxsat = \frac{C_t}{C_s}.$$

Maxsat represents the maximum amount of saturation that can be applied to this input pixel so as not to violate the boundary constraints of the target color gamut. In FIG. 2, the final saturation parameter provided by gamut bounded saturation 203 to saturation processor 212 may be a function of maxsat and the global saturation parameter.

Referring now to FIG. 3 and RGB and gamut bounded saturation 303, RGB bounded saturation applies the same saturation to all pixels, provided the maximum allowable saturation value computed for that pixel are within valid range in the RGB color space. In contrast, gamut bounded saturation may provide an added benefit in areas of the image which have high (and low) luminance values. As can be seen in FIG. 7, smaller saturation values may be applied to pixels having high (and low) luminance values as compared to mid-range luminance values, because the differences between the source and target color gamuts is smaller at high (and low) luminance values. This may advantageously reduce the occurrence of the color banding artifacts.

In some embodiments, variations to gamut bounded saturation functions may be provided to further improve color enhancement. There may be instances when even after the $f(C_n)$ mapping of an input pixel, the resulting enhanced chrominance value $C_t$ will remain within the gamut boundary of the source color gamut, i.e. $C_t < g_s[L,H]$. In one embodiment, to provide an additional chrominance boost in order to increase the saturation of enhanced chrominance value $C_t$ to be closer to $g_s[L,H]$, the equation for $C_t$ can be modified with a user settable parameter alpha such that, $C_t = f(C_n) * C_{sm} * $ alpha. To improve fleshtone exclusion during color enhancement, the alpha parameter may be reduced for a hue range [h1,h2] corresponding to fleshtones. This prevents the fleshtones from additional coloration during the color enhancement process.

In some embodiments, the color gamut of the source is not known apriori. In some instances, the actual color gamut of the source may be greater than $g_s[L,H]$ because $g_s[L,H]$ may have been computed based on an assumed color gamut of the source and not on the actual color gamut. In such cases, gamut bounded saturation may be disabled because the input pixels from the source may already be in the larger target color gamut of the display.

It should be noted that although the description of gamut boundary saturation above assumed that the source color gamut is smaller than the target color gamut, the approach described above would still work with a target color gamut that is smaller than the source color gamut. In this case, the mapping will de-saturate the colors of the input pixels so that the resulting color would be within the smaller target color gamut.

In FIG. 3, RGB and gamut bounded saturation 303 includes both RGB and Gamut bounded saturation functions. The final saturation parameter output from RGB and gamut bounded saturation 303 may be based on the output of each of the underlying saturation limit functions. The arrangement of the individual saturation functions within RGB and gamut bounded saturation 303 may be in a parallel mode configuration or series mode configuration.

Figure 11:
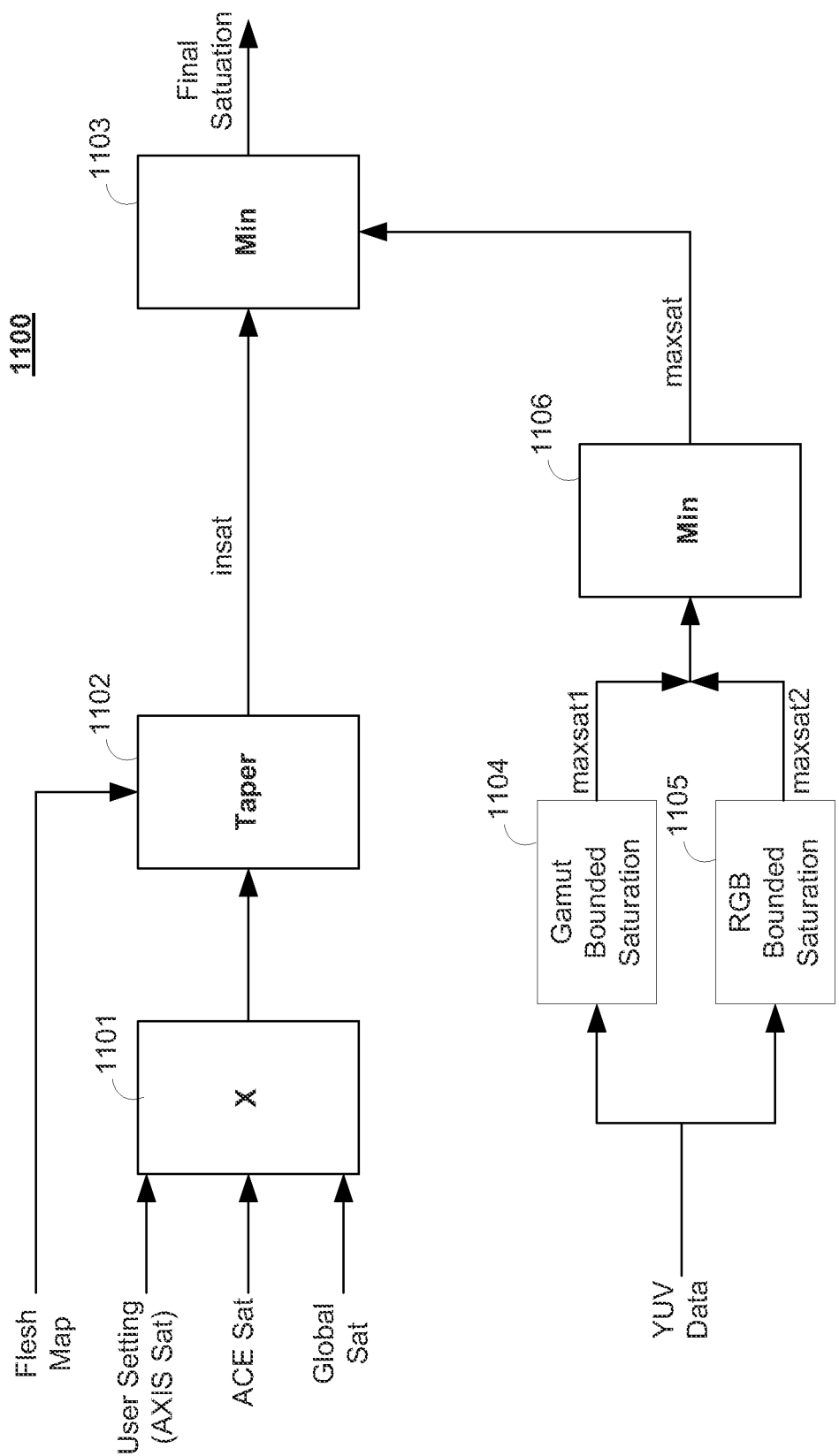
FIG. 11 shows an illustrative block diagram of RGB and gamut bounded saturation having a parallel mode configuration in accordance with an embodiment of the present disclosure.

FIG. 11 shows an illustrative block diagram 1100 of RGB and gamut bounded saturation using a parallel mode configuration. Gamut bounded saturation 1104 determines a saturation limit, maxsat1, for an input pixel using a gamut bounded saturation function. RGB bounded saturation 1105 determines a saturation limit, maxsat2, for the same input pixel using an RGB bounded saturation function. The final saturation parameter that is output by RGB and gamut bounded saturation 1100 is the minimum of maxsat1 and maxsat2. An advantage of this parallel configuration is that the resulting saturation that is applied to the pixel is calculated to meet the valid pixel range limits (RGB Bounded Saturation) and the target gamut boundary limits (Gamut bounded saturation). In FIG. 11, the user setting (AXIS sat), ACE sat, Global Sat, and flesh map are input to taper function 1102 to calculate the insat parameter. Insat is the input or desired saturation. If insat is less than or equal to maxsat, then the final saturation will be equal to insat. Otherwise, if insat is greater than maxsat, the final saturation will be equal to maxsat. Additional details related to that calculation of insat are described in U.S. patent application Ser. No. 11/296,163, which was filed on Dec. 7, 2005, entitled "INTELLIGENT COLOR REMAPPING OF VIDEO DATA," and U.S. patent application Ser. No. 11/295,882, titled which was filed on Dec. 7, 2005, entitled "INTELLIGENT SATURATION OF VIDEO DATA," both incorporated by reference herein.

Figure 12:
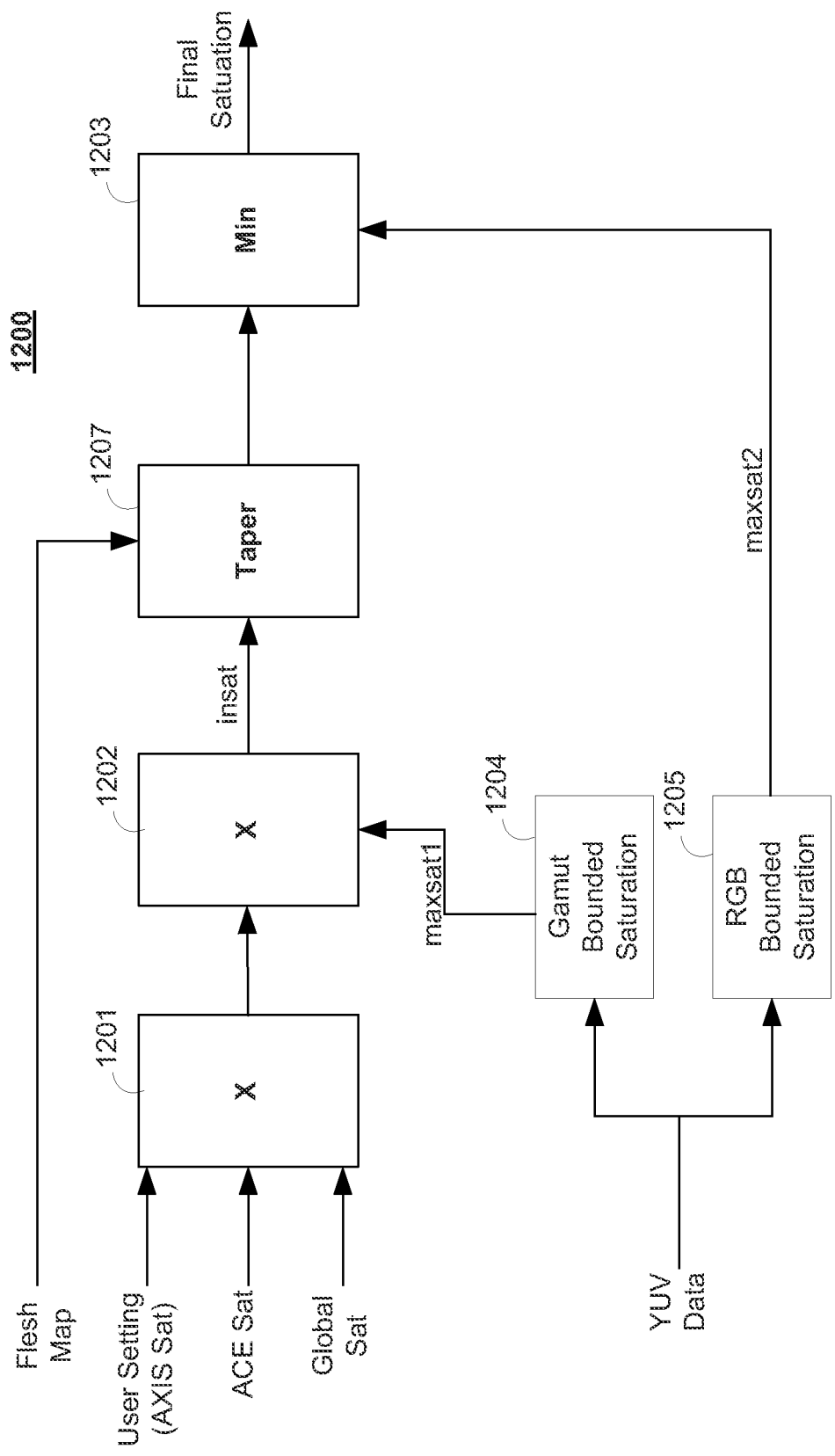
FIG. 12 shows an illustrative block diagram of RGB and gamut bounded saturation having a series mode configuration in accordance with an embodiment of the present disclosure.

FIG. 12 shows an illustrative block diagram 1200 of an RGB and gamut bounded saturation using a series mode configuration. This configuration may be preferable to parallel mode configuration when the image content itself has a very small color gamut relative to the source color gamut. In this instance, the gamut expansion provided by the gamut bounded saturation may result in expanded chrominance values that are still well within the source gamut boundary $g_s[L,H]$. Under these circumstances, the user specified saturation may be boosted further by the output of the gamut bounded saturation block. The resulting saturation limit may then be compared against the RGB bounded saturation limit. This configuration can provide a very vivid enhancement to the colors relative to the parallel configuration. In another embodiment, a single RGB and gamut bounded saturation block may be able to operated in both the parallel and serial configuration modes. For example, multiplexers may allow switching between these either of these two configurations.

By way of recapitulation and extension of the above, some of the benefits and advantages of the disclosed embodiments are summarized in the following. One benefit/advantage of the disclosed embodiments is to provide a color enhancement function that enhances colors such that the enhancement function adapts to the color gamut of the display or other target device.

Another possible benefit/advantage of the disclosed embodiments is to provide a color enhancement function that takes a source color, which is in a smaller color gamut and enhances the color, such that the resulting color is within the wider color gamut of a target display, while at the same time providing a vivid rendition of the color.

Still another possible benefit/advantage of the disclosed embodiments is to provide a color gamut mapping function that takes a source color, which may be in a larger color gamut relative to a target display color gamut, and transform the source color such that the resulting color falls within the smaller target display color gamut. The disclosed embodiments address both the color enhancement as well as the desaturation of colors because the gamut mapping function takes into account both the source color gamut and the target color gamut.

Yet another possible benefit/advantage of the disclosed embodiments is to provide a gamut mapping function such that the achromatic colors do not have any visible coloration introduced during the color enhancement process.

Still yet another possible benefit/advantage of the disclosed embodiments is to provide a color enhancement system and method in which the enhancement can be done in an automatic manner using the color gamut boundaries of the source and the destination. The enhancement can also be controlled using controls that are provided by the user to reflect the user's preference for how the colors are enhanced. For example, if a user prefers the reds in the scene be more emphasized, it is possible to take this control into account while at the same time ensuring that the final enhanced color is within the color gamut of the target display.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

What is claimed is:

1. A method for gamut bounded saturation adaptive color enhancement of an input pixel associated with a source color gamut for display on a device associated with a target color gamut, the method comprising:
   receiving the input pixel, wherein the input pixel is associated with a pixel chrominance value;
   determining a maximum source chrominance value for the pixel based on the source color gamut;
   determining a maximum target chrominance value for the pixel based on the target color gamut;
   calculating a gamut bounded saturation value based on the pixel chrominance value, the maximum source chrominance value, and the maximum target chrominance value; and
   adjusting the pixel chrominance value based on the gamut bounded saturation value.

2. The method of claim 1, wherein receiving the input pixel further comprises converting the received input pixel to an LCH color space value.

3. The method of claim 1, wherein:
   determining the maximum source chrominance value comprises accessing a source gamut boundary description look-up table; and
   determining the maximum target chrominance value comprises accessing a target gamut boundary description look-up table,
   wherein the source and the target gamut boundary description look-up tables store maximum chrominance values for every pair of luminance and hue values.

4. The method of claim 3, further comprising computing the source and the target gamut boundary description look-up tables.

5. The method of claim 4, wherein computing each of the source and the target gamut boundary description look-up tables comprises:
   initializing a gamut boundary description array;
   looping through a predetermined set of RGB values;
   for each RGB value in the predetermined set of RGB values:
      transforming the RGB value from an RGB color space into an LCH value in an LCH color space, wherein the LCH value includes a luminance value, a chrominance value, and a hue value,
      comparing a maximum chrominance value stored in the gamut boundary description array associated with the luminance value and the hue value with the chrominance value of the LCH value, and
      storing the chrominance value of the LCH value in the gamut boundary description array when the chrominance value of the LCH value is larger than the maximum chrominance value.

6. The method of claim 1, wherein calculating the saturation value comprises using a linear mapping function between the maximum source chrominance value for the pixel and the maximum target chrominance value for the pixel.

7. The method of claim 1, wherein calculating the saturation value comprises using a knee mapping function between the maximum source chrominance value for the pixel and the maximum target chrominance value for the pixel.

8. The method of claim 1, wherein calculating the saturation value comprises using a nonlinear mapping function between the maximum source chrominance value for the pixel and the maximum target chrominance value for the pixel.

9. The method of claim 1, further comprising:
   calculating an RGB bounded saturation limit value for the received input pixel;
   calculating a gamut adjusted chrominance value for the pixel based on the gamut bounded saturation limit value; and
   calculating an RGB adjusted chrominance value for the pixel based on the RGB bounded saturation limit value, wherein the gamut adjusted chrominance value is calculated in parallel with the RGB adjusted chrominance value.

10. The method of claim 1, further comprising:
   calculating an RGB bounded saturation limit value for the received input pixel;
   calculating a gamut adjusted chrominance value for the pixel based on the gamut bounded saturation limit value; and
   calculating a RGB adjusted chrominance value for the pixel based on the RGB bounded saturation limit value, wherein the RGB adjusted chrominance value is calculated based on the gamut adjusted chrominance value for the pixel.

11. An intelligent color remapper circuit for gamut bounded saturation adaptive color enhancement of an input pixel associated with a source color gamut for display on a device associated with a target color gamut, the circuit comprising:
receiver circuitry operable to receiving the input pixel, wherein the input pixel is associated with a chrominance value;
source gamut boundary description circuitry operable to determine a maximum source chrominance value for the pixel based on the source color gamut;
target gamut boundary description circuitry operable to determine a maximum target chrominance value for the pixel based on the target color gamut;
gamut bounded saturation circuitry operable to calculate a gamut bounded saturation value based on the chrominance values for the pixel, the maximum source chrominance value for the pixel, and the maximum target chrominance value for the pixel; and
saturation processor circuitry operable to adjust the chrominance value for the pixel based on the gamut bounded saturation value.

12. The intelligent color remapper of claim 11, wherein the receiver circuitry is further operable to convert the received input pixel to an LCH color space value.

13. The intelligent color remapper of claim 11, wherein the source and the target gamut boundary description circuitry are further operable to:
access a source gamut boundary description look-up table; and
access a target gamut boundary description look-up table, wherein the source and the target gamut boundary description look-up tables store maximum chrominance values for every pair of luminance and hue values.

14. The intelligent color remapper of claim 13, further comprising source and target gamut boundary description computation circuitry operable to compute the gamut boundary description look-up tables.

15. The intelligent color remapper of claim 14, wherein the source and target gamut boundary description computation circuitry is operable to:
initialize a gamut boundary description array;
loop through a predetermined set of RGB values;
for each RGB value in the predetermined set of RGB values:
transform the RGB value from an RGB color space into an LCH value in an LCH color space, wherein the LCH value includes a luminance value, a chrominance value, and a hue value,
compare a maximum chrominance value stored in the gamut boundary description array associated with the luminance value and the hue value with the chrominance value of the LCH value, and
store the chrominance value of the LCH value in the gamut boundary description array when the chrominance value is larger than the maximum chrominance value of the LCH value.

16. The intelligent color remapper of claim 11, wherein the gamut bounded saturation circuitry is operable to calculate the gamut bounded saturation value using a linear mapping function between the maximum source chrominance value for the pixel and the maximum target chrominance value for the pixel.

17. The intelligent color remapper of claim 11, wherein the gamut bounded saturation circuitry is operable to calculate the gamut bounded saturation value using a knee mapping function between the maximum source chrominance value for the pixel and the maximum target chrominance value for the pixel.

18. The intelligent color remapper of claim 11, wherein the gamut bounded saturation circuitry is operable to calculate the gamut bounded saturation value using a nonlinear mapping function between the maximum source chrominance value for the pixel and the maximum target chrominance value for the pixel.

19. The intelligent color remapper of claim 11 further comprising:
RGB bounded saturation circuitry operable to calculate an RGB bounded saturation limit value for the received input pixel;
circuitry operable to calculate a gamut adjusted chrominance value for the pixel based on the gamut bounded saturation limit value; and
circuitry operable to calculate an RGB adjusted chrominance value for the pixel based on the RGB bounded saturation limit value, wherein the gamut adjusted chrominance value is calculated in parallel with the RGB adjusted chrominance value.

20. The intelligent color remapper of claim 11 further comprising:
RGB bounded saturation circuitry operable to calculate an RGB bounded saturation limit value for the received input pixel;
circuitry operable to calculate a gamut adjusted chrominance value for the pixel based on the gamut bounded saturation limit value; and
circuitry operable to calculate an RGB adjusted chrominance value for the pixel based on the RGB bounded saturation limit value, wherein the RGB adjusted chrominance value is calculated based on the gamut adjusted chrominance value for the pixel.

* * * * *